United States Patent
McConnell et al.

(10) Patent No.: US 9,529,917 B2
(45) Date of Patent: Dec. 27, 2016

(54) SYSTEM AND METHOD FOR GENERATING INFORMATION FEED BASED ON CONTEXTUAL DATA

(71) Applicant: salesforce.com, inc., San Francisco, CA (US)

(72) Inventors: Jager McConnell, San Francisco, CA (US); Ciara Peter, San Francisco, CA (US)

(73) Assignee: saleforce.com, inc., San Francisco, CA (US)

( * ) Notice: Subject to any disclaimer, the term of this patent is extended or adjusted under 35 U.S.C. 154(b) by 245 days.

(21) Appl. No.: 13/898,739

(22) Filed: May 21, 2013

(65) Prior Publication Data

US 2014/0351263 A1    Nov. 27, 2014

(51) Int. Cl.
    *G06F 17/30*    (2006.01)
(52) U.S. Cl.
    CPC ... *G06F 17/30867* (2013.01); *G06F 17/30699* (2013.01); *G06F 17/3053* (2013.01); *G06F 17/30386* (2013.01)
(58) Field of Classification Search
    CPC ............ G06F 17/3053; G06F 17/30386; G06F 17/30867
    USPC ........................................................ 707/748
    See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |

(Continued)

OTHER PUBLICATIONS

Saba, "Saba Announces Revolutionary Social Enterprise Platform," Press Release, Mar. 20, 2012, pp. 1-4, Redwood Shores, California.

*Primary Examiner* — Thanh-Ha Dang
(74) *Attorney, Agent, or Firm* — Dergosits & Noah LLP; Todd A. Noah

(57) ABSTRACT

Disclosed are systems, apparatus, and methods for generating an information feed based on contextual data. User contextual data associated with a user is retrieved. The user contextual data identifies entities associated with the user. Data objects may be identified based on the retrieved user contextual data. Data object contextual data associated with the data objects may be retrieved. Feed items may be generated based on the data objects and the retrieved data object contextual data. A weight associated with each of the feed items may be generated. The weight may be generated based on the retrieved user contextual data and the retrieved data object contextual data. An information feed including at least some of the feed items may be generated. The information feed may arrange the at least some of the feed items based on the generated weight associated with each of the at least some of the feed items.

20 Claims, 9 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff et al. |
| 6,216,135 B1 | 4/2001 | Brodersen et al. |
| 6,233,617 B1 | 5/2001 | Rothwein et al. |
| 6,236,978 B1 | 5/2001 | Tuzhilin et al. |
| 6,266,669 B1 | 7/2001 | Brodersen et al. |
| 6,288,717 B1 | 9/2001 | Dunkle et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,100,111 B2 | 8/2006 | McElfresh et al. |
| 7,269,590 B2 | 9/2007 | Hull et al. |
| 7,340,411 B2 | 3/2008 | Cook |
| 7,373,599 B2 | 5/2008 | McElfresh et al. |
| 7,386,565 B1* | 6/2008 | Singh ............... G06F 17/30489 |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,945,653 B2 | 5/2011 | Zuckerberg et al. |
| 8,005,896 B2 | 8/2011 | Cheah et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,103,611 B2 | 1/2012 | Tuzhilin et al. |
| 8,150,913 B2 | 4/2012 | Cheah et al. |
| 8,275,836 B2 | 9/2012 | Beaven et al. |
| 8,582,565 B1* | 11/2013 | Morsy ..................... H04L 67/02 348/14.04 |
| 8,959,083 B1* | 2/2015 | Gyongyi ............... G06Q 10/00 705/319 |
| 9,146,986 B2* | 9/2015 | Dunn ............... G06F 17/30699 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2010/0023506 A1* | 1/2010 | Sahni ............... G06F 17/30876 707/E17.014 |
| 2011/0137894 A1* | 6/2011 | Narayanan ......... G06F 17/3089 707/723 |
| 2012/0084340 A1* | 4/2012 | McCormack ......... G06Q 30/01 709/203 |
| 2013/0054615 A1* | 2/2013 | Liu .................. G06F 17/30867 707/748 |
| 2013/0097515 A1* | 4/2013 | Kermoian ......... H04M 1/72597 715/738 |
| 2013/0103538 A1* | 4/2013 | Scholl ............... G06Q 30/0601 705/26.7 |
| 2013/0282696 A1* | 10/2013 | John ................ G06F 17/30991 707/722 |
| 2013/0290233 A1* | 10/2013 | Ferren ............... G06K 9/3266 706/46 |
| 2013/0290339 A1* | 10/2013 | LuVogt ............ G06F 17/30867 707/740 |
| 2013/0311462 A1* | 11/2013 | Khan ................ G06F 17/2785 707/728 |
| 2014/0052782 A1* | 2/2014 | Ryan .................. H04L 67/306 709/204 |
| 2014/0114965 A1* | 4/2014 | Balduzzi ........... G06F 17/30867 707/723 |
| 2014/0129942 A1* | 5/2014 | Rathod ............ H04N 21/44222 715/720 |
| 2014/0229293 A1* | 8/2014 | Huang ............... G06Q 30/0273 705/14.69 |

(56) References Cited

U.S. PATENT DOCUMENTS

| | | | | |
|---|---|---|---|---|
| 2014/0258889 A1* | 9/2014 | Badge | ............... | G06F 17/30873 |
| | | | | 715/760 |
| 2014/0280108 A1* | 9/2014 | Dunn | ................ | G06F 17/30699 |
| | | | | 707/728 |
| 2014/0282098 A1* | 9/2014 | McConnell | ........ | G06Q 10/0639 |
| | | | | 715/753 |
| 2014/0297743 A1* | 10/2014 | Zyto | ....................... | H04L 67/10 |
| | | | | 709/204 |

* cited by examiner

SYSTEM AND METHOD FOR GENERATING INFORMATION FEED BASED ON CONTEXTUAL DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to computer systems and software, and, more particularly, to online social networking and information feeds.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Organizations and enterprises typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations and enterprises increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
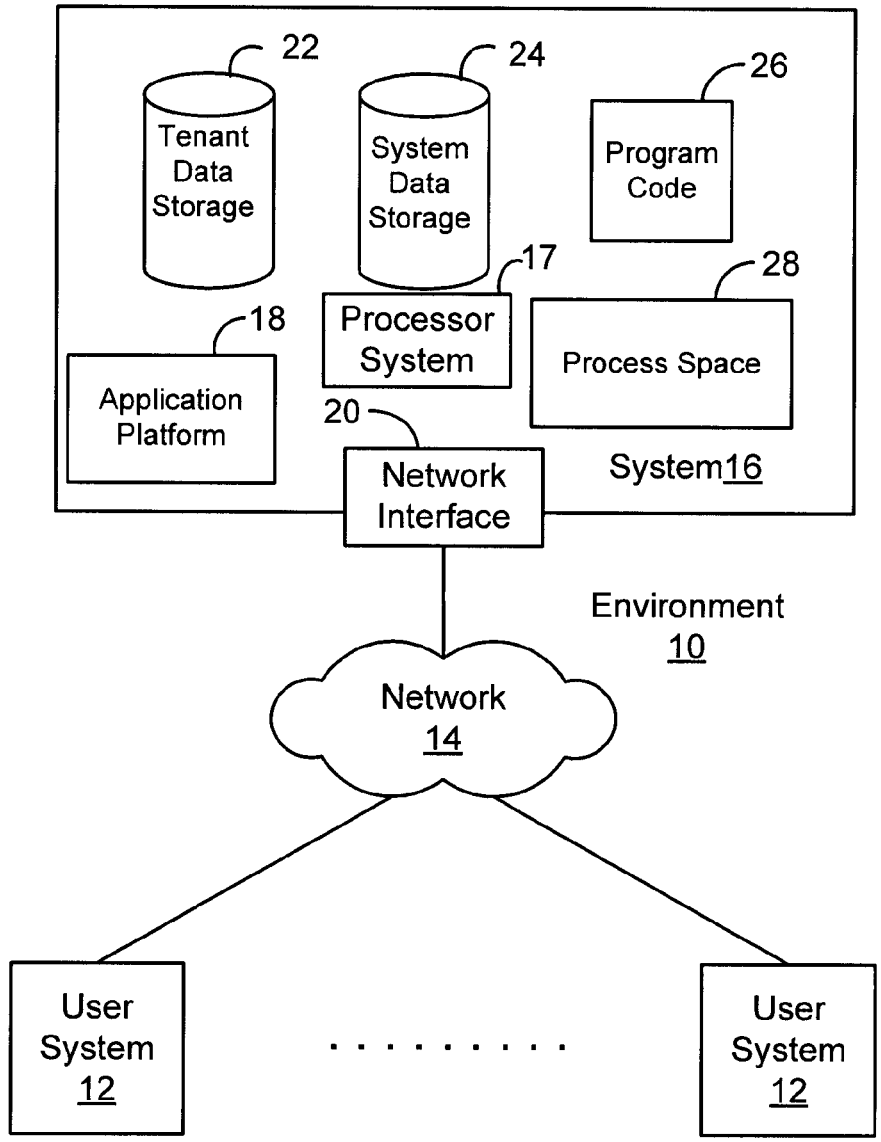
FIG. 1 shows a block diagram of an example of an environment 10 in which an on-demand database service can be used in accordance with some implementations.

Systems and methods are provided for generating an information feed based on contextual data. Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks" or "steps," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer program products for a support portal system that may interact with or include an online social network, also referred to herein as a social networking system or an enterprise social network. Feed items in an information feed may include information updates stored in an on-demand database service environment. In some implementations, the disclosed methods, apparatus, systems, and computer program products may be configured or designed for use in a multi-tenant database environment.

In some implementations, an online social network may allow a user to follow data objects in the form of records such as cases, accounts, or opportunities, in addition to following individual users and groups of users. One example of such an online social network is Chatter®, provided by Salesforce.com® of San Francisco, Calif. Such online social networks can be implemented in various settings, including enterprises such as business organizations or groups within such an organization. For instance, Chatter® can be used by employee users of a business organization to communicate and collaborate with each other for various purposes.

The "following" of a record stored in a database, as described in greater detail below, allows a user to track the progress of that record. Updates to the record, also referred to herein as changes to the record, can occur and be noted on an information feed such as the record feed or the news feed of a user subscribed to the record. With the disclosed implementations, such record updates are often presented as an item or entry in the feed. Such a feed item can include a single update or a collection of individual updates. Information updates presented as feed items in an information feed can include updates to a record, as well as other types of updates such as user actions and events, as described herein.

Examples of record updates include field changes in the record, as well as the creation of the record itself. Examples of other types of information updates, which may or may not be linked with a particular record depending on the specific use of the information update, include messages as described herein. Examples of such messages include posts such as explicit text or characters submitted by a user, multimedia data sent between or among users (for instance, included in a post), status updates such as updates to a user's status or updates to the status of a record, uploaded files, indications of a user's personal preferences such as "likes" and "dislikes," and links to other data or records.

Information updates can also be group-related, e.g., a change to group status information for a group of which the user is one of possibly additional members. A user following, e.g., subscribed to, a record is capable of viewing record updates on the user's news feed, which can also include the other various types of information updates described above. Any number of users can follow a record and thus view record updates in this fashion. Some records are publicly accessible, such that any user can follow the record, while other records are private, for which appropriate security clearance/permissions are a prerequisite to a user following the record.

Online social networks are increasingly becoming a common way to facilitate communication between individuals and groups of individuals, any of whom can be recognized as "users" of a social networking system. In many social networks, individuals may establish connections with one other, which may be referred to as "friending" one another. By establishing such a connection, one user may be able to see information generated by or associated with another user. For instance, a first user may be able to see information posted by a second user to the first user's personal social network page. One implementation of such a personal social network page is a user's profile page, for example, in the form of a web page representing the user's profile. For example, a post submitted by the second user about the first user can be presented on the first user's profile feed, also referred to herein as the user's "wall," which can be displayed on the first user's profile page.

In some implementations, an information feed in the context of a social network may be a collection of information selected from the social network for presentation in a user interface. The information presented in the information feed may include posts to a user's wall or any other type of information accessible within the social network. A feed item can include various types of data including character-based data, audio data, video data, or combinations of these. For instance, a post can include text in combination with a JPEG image or animated image.

Feed items in information feeds such as a user's news feed may include messages, which can take the form of: posts comprising textual/character-based inputs such as words, phrases, statements, questions, emotional expressions, symbols, leetspeak, or combinations of these; responses to posts, also referred to herein as "comments", such as words, phrases, statements, answers, questions, reactionary emotional expressions, or combinations of these; indications of personal preferences which can be submitted as responses to posts or comments; status updates; and hyperlinks. In other examples, messages can be in the form of file uploads, such as presentations, documents, multimedia files, and the like.

In some implementations, a news feed may be specific to an individual user, a group of users, or a data object (e.g., a file, document, Web page, or a collection of documents, files, or Web pages). For instance, a group of users on a social network may publish a news feed. Members of the group and the larger social network may view and post to the group news feed in accordance with a permissions configuration for the news feed and the group.

In some implementations, when data such as posts or comments input from one or more users are published to an information feed for a particular user, group, object, or other construct within a social network, an e-mail notification or other type of notification (e.g., text message) may be transmitted to all users following the user, group, or object in addition to the posting of the published data as a feed item in one or more feeds, such as a news feed or a record feed. In some social networks, the occurrence of such a notification is limited to the first instance of a published input, which may form part of a larger conversation. For instance, a notification may be transmitted for an initial post, but neither for comments on the post nor for follow-up posts related to the initial post. In some other implementations, notifications are transmitted for all such published inputs.

These and other implementations described and reference herein may be embodied in various types of hardware, software, firmware, of combinations of these. For example, some techniques disclosed herein may be implemented, at least in part, by machine-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows for a potentially much greater number of customers. The term "query plan" generally refers to one or more operations used to access information in a database system.

In some implementations, a "user profile" or "user's profile" may generally be configured to store and maintain data about the user of the database system. The data can include general information, such as title, phone number, a photo, a biographical summary, and a status (e.g., text describing what the user is currently doing). As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a subscriber (custom object). For example, a record can be for a business partner or potential business partner (e.g., a client, vendor, distributor, etc.) of the user, and can include an entire company, subsidiaries, or contacts at the company. As another example, a record can be a project that the user is working on, such as an opportunity (e.g., a possible sale) with an existing partner, or a project that the user is trying to get. In one implementation of a multi-tenant database, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post published by a user. Feed items of information about a user can be presented in a user's profile feed of the database, while feed items of information about a record can be presented in a record feed in the database, by way of example. A profile feed and a record feed are examples of different information feeds. A second user following a first user or record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. Other similar sections of a user's profile can also include an "About" section. A record can also have a status, the update of which can be provided by an owner of the record or other users having suitable write access permissions to the record. The owner can be a single user, multiple users, or a group. In one implementation, there is only one status for a record.

In one implementation, a comment can be made on any feed item. In another implementation, comments are organized as a list explicitly tied to a particular feed tracked update, post, or status update. In this implementation, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In one implementation, a "group feed" includes any feed item about any user in a group. In another implementation, the group feed includes feed items that are about the group as a whole. In one implementation, the feed items for a group are only posts and comments.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" is a feed of feed items about a particular user. In one implementation, the feed items for a profile feed are posts and comments that other users make about or send to the particular user, and status updates made by the particular user. Such a profile feed can be displayed on a page associated with the particular user. In another implementation, feed items in a profile feed could include posts made by the particular user and feed tracked updates initiated based on actions of the particular user.

Conventional methods of providing support information about products and services remain limited because conventional methods do not automatically identify and aggregate or collect support information about a user's products or services from various different sources. Thus, if a user, who may be a customer that purchases goods or subscribes to services, wants to be provided with the most recent or relevant support information for his or her products or services, the user must manually navigate to each source of information, and identify and retrieve the relevant information by himself or herself. This may involve a cumbersome and laborious process of navigating to and searching several different web pages, blogs, forums, support pages, and social network posts. Moreover, conventional methods do not provide a way to automatically compare all of the information and generate an information feed that presents the user with the most relevant information. Therefore, while the user may manually navigate through various different web pages, blogs, forums, and other sources, the user is not provided with an automatically generated unified view of the most relevant support related information.

In various implementations disclosed herein, systems, apparatus, and methods are provided for generating a support information feed for a user based on contextual data. A support information feed may be an information feed presented in a support portal used to present a user with a unified view of support information for any or all products and services that the user owns, uses, or subscribes to. The support information feed may include feed items that include data and information about support related data objects, such as support pages, news or press releases announcing new product features, blog posts, forum posts, and feed items retrieved from social networks or services. Products and services for which the support information feed is generated may be identified based on user contextual data, which may include user profile data, such as a user's professional field, specialty, technical expertise, and professional skills. The user contextual data may also include the user's purchase history, other logged e-commerce activities, and user-defined lists. Feed items included in the support information feed may be weighted or ranked based on a comparison between the user contextual data and data objects and data object contextual data. Data object contextual data may be metadata associated with retrieved data objects. The metadata may include one or more data values identifying a timestamp, number of shares, re-posts, follows, tweets, mentions, a source of the information, an author, and a type of update.

Thus, various systems, apparatus, and methods disclosed herein may aggregate information and data about all products and services that the user owns, subscribes to, or is interested in. The retrieved information may be converted into a format, such as several feed items, capable of being presented in an information feed. The retrieved information may be analyzed and weighted such that the product related information most relevant to the user is presented most prominently or in a highest position in the support information feed. Once the weights have been determined, the support information feed may be generated, rendered, and presented to the user. In this way, the user may be presented with the most relevant product related information retrieved from various different sources that may be distributed across several communications networks, which may include the Internet.

FIG. 1 shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be any machine or system that is used by a user to access a database system 16. For example, any of user systems 12 can be a handheld computing device, a mobile phone, a laptop computer, a work station, and/or a network of such computing devices. As illustrated in FIG. 1 user systems 12 might interact via a network 14 with an on-demand database service, which is implemented in the example of FIG. 1 as database system 16.

An on-demand database service, such as system 16, is a database system that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. A computer program product implementation includes a non-transitory machine-readable storage medium (media) having instructions stored thereon/in, which can be used to program a computer to perform any of the processes/methods of the implementations described herein. Computer program code 26 for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage system such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline back-ups or other redundancies, etc., and might include a distributed database or storage network and associated processing intelligence.

Figure 2:
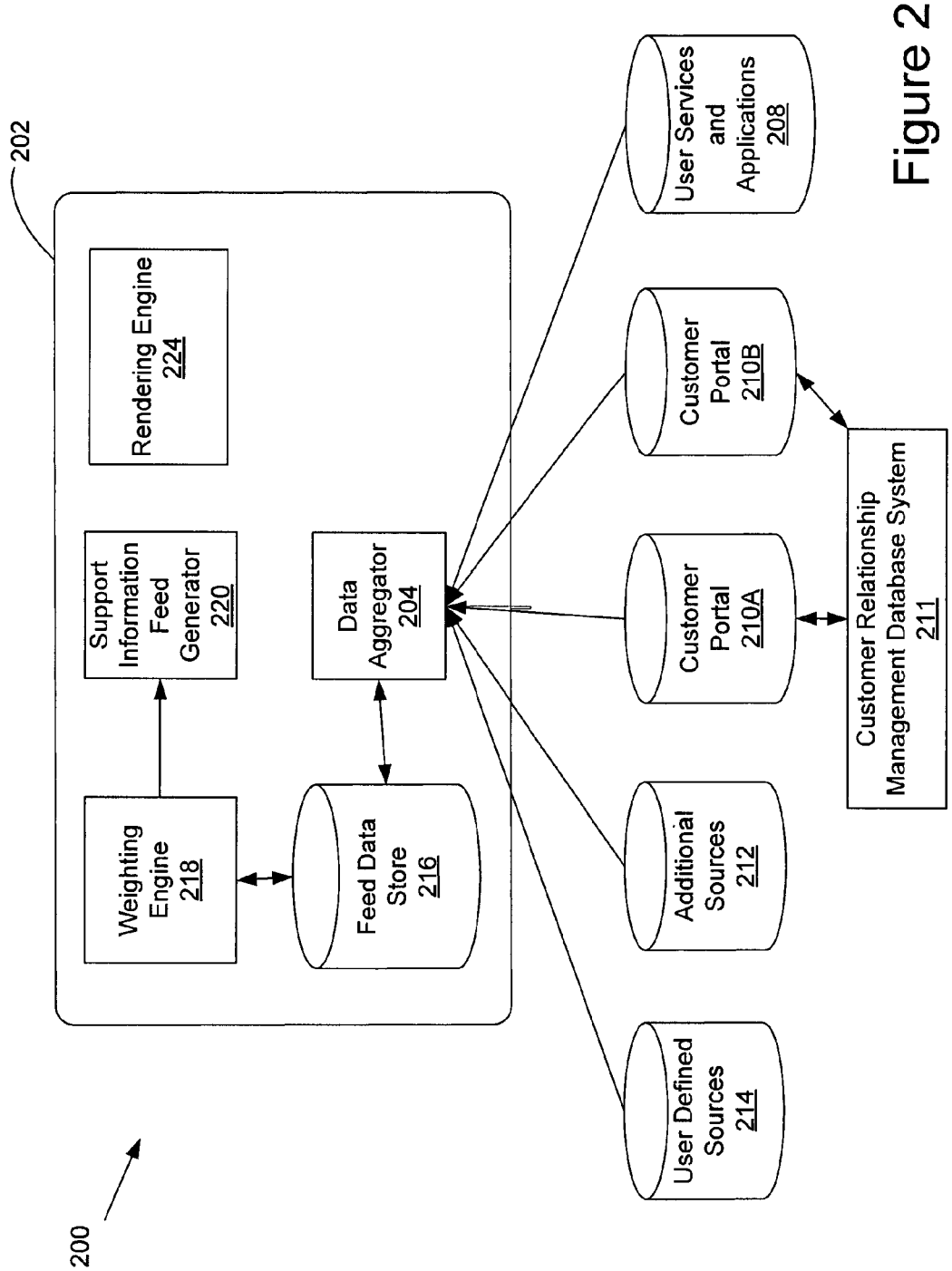
FIG. 2 illustrates a block diagram of an example of a system that may aggregate contextual information about products and services associated with a user and generate a support information feed based on the aggregated information, in accordance with some implementations.

FIG. 2 illustrates a block diagram of an example of a system that may aggregate contextual information about products and services associated with a user and generate a support information feed based on the aggregated information, in accordance with some implementations. Accordingly, system 200 may include hardware and software components configured to identify and retrieve information about various products and services that a user, such as a customer, may own or may be interested in. One or more components included in system 200 may be configured to use the information identifying the products and services to identify and retrieve data objects and contextual data identifying updates, upgrades, news articles, and other information associated with the products and services. Components included in system 200 may be further configured to generate and rank feed items based on the retrieved information. Components of system 200 may be further configured to generate an information feed that presents the user with a graphical representation of the updates, upgrades, and other information most relevant to the user at the time the information feed is generated.

System 200 may include support feed generation system 202, which may be a system including one or more components configured to generate an information feed based on products and services associated with a user. Components included in support feed generation system 202 may be software or hardware implemented in one or more servers. For example, a component of support feed generation system 202 may be a software application or process implemented on and executed by at least one server of a cloud provided by a service provider, such as Salesforce.com®. In addition to aggregating and storing feed items, support feed generation system 202 may be configured to rank or order feed items such that the presentation of the feed items in an information feed is ordered based on contextual information associated with the user.

Accordingly, support feed generation system 202 may include data aggregator 204, which may be configured to aggregate information from various sources. The aggregated information may include data objects and/or feed items related to products and/or services, contextual information associated with the data objects and/or feed items, and contextual information associated with the user. Thus, data aggregator 204 may be configured to identify and retrieve data objects and/or feed items to be included in a support information feed that provide information, such as updates, upgrades, and news events that relate to one or more products that are relevant to the user.

As similarly discussed above, retrieved data objects may identify products or services that a user has used, purchased, liked, followed, saved in a list, mentioned, searched for, reviewed, or favorite. Retrieved data objects may also identify updates, upgrades, articles, etc. that relate to a product. Retrieved data objects may include information identifying the object, providing a link to a product page, providing information about updates, upgrades, service announcements, blog posts, articles, or reviews. Contextual information associated with a data object may be associated data such as metadata. Contextual information may include one or more data values identifying one or more of the following: a timestamp; a number of shares, re-posts, follows, tweets, or mentions; a source of the data object, such as an author or an entity; and a type of data object.

In some implementations, data aggregator 204 includes a query engine configured to generate and execute one or more query strategies to query various different sources. In some implementations, the query strategies may be configured by a user, such as a system administrator. The query strategy may be configured based on previously retrieved and stored product information that is specific to the user. For example, the query strategy may be determined based on products that were bought by the user, wish lists, and information imported from other sites. The query strategy may also be configured based on a type of source that is being queried. For example, a first type of query strategy may be used for a blog and a second type of query strategy may be used for a social network. The different sources queried by data aggregator 204 may be identified based on a predetermined or dynamically populated list. For example, a list of sources previously determined by a software developer or system administrator may identify a list of blogs that are to be queried by data aggregator 204. A query may be executed for each identified source and any data objects identified by one or more query strategies may be retrieved from each identified source. While system 200 illustrates one data aggregator, in some implementations, multiple data aggregators are used, where each data aggregator may have a particular query strategy configured for a particular source.

In some implementations, data aggregator 204 may be communicatively coupled to user defined sources 214, which may include resources that have been previously identified by the user. For example, a user may like, follow, or subscribe to various sources such as support pages, fan pages, blogs, forums, customer reviews, online electronic commerce sites, and articles. One or more data values identifying sources that the user has identified or defined may have been previously stored during a previous iteration of an aggregation method, or may be retrieved from one or more user profiles stored in various social networks and online commerce sites which monitor and log such information. Data aggregator 204 may be configured to retrieve one or more data values identifying user defined sources 214 and use the retrieved one or more data values to formulate a query strategy that will be applied to user defined sources 214.

In some implementations, user defined sources 214 include one or more social networks, such as Twitter®, Facebook®, and Yelp®. The social networks may store information in a series of pages associated with users of the social networks. For example, a social network, such as Twitter®, may store various posts made by a user in a page associated the user's social network account. Data aggregator 204 may be configured to identify one or more social networks based on the retrieved information identifying user defined sources 214, and further configured to crawl and analyze posts made in the social networks to identify any posts and pages that are relevant to the user. Data aggregator 204 may be configured to analyze text characters and words, or identify symbols or identifiers, such as hashtags and mentions, to determine whether or not a post or page should be returned as a result of the query retrieved by data aggregator 204.

Data aggregator 204 may be communicatively coupled to additional sources 212, which may be sources that are not explicitly identified or defined by a user. Additional sources 212 may include various blogs, articles, online publications, e-commerce websites, social networks, and forums. Additional sources 212 may be identified based on a predetermined list which may be populated based on a predetermined input and/or user provided input. Data aggregator 204 may query each source identified in the predetermined list to identify and retrieve data objects relevant to the user's support information feed. Additional sources 212 may be identified and queried based on previously identified products and services, and based on products and services that were identified based on one or more characteristics of the user's profile. Data aggregator 204 may be configured to crawl additional sources 212 and retrieve any relevant data objects and contextual data.

Data aggregator 204 may be communicatively coupled to customer portal 210A and customer portal 210B. In various implementations, a customer portal is an interface provided by a service provider, such as Salesforce.com®. The customer portal may provide several users with access to an organization's database system. In some implementations, the organization is a tenant in a multi-tenant database system, such as customer relationship management database system 211. Thus, a customer portal may provide an interface between a user and an organization's portion of customer relationship management database system 211. The customer portal may manage and customize each user's interaction with data and information stored in a database system which may belong to and may be managed by a company or organization that may provide a product or service. For example, an electronics manufacturer may store information about its products and customers in a CRM database provided by a service provider, such as Salesforce.com®. A customer portal may be instantiated and implemented as an interface between customers and the electronics manufacturer's data stored in the CRM database.

In various implementations, data aggregator 204 may be communicatively coupled to customer portals 210A and 210B via a communications network, such as the Internet. Data aggregator 204 may be configured to query information stored and maintained by customer portals 210A and 210B about various users and their preferences. Data aggregator 204 may also be configured to query customer relationship management database 211 to retrieve data and information about products and services that underlie the user-related information retrieved from customer portals 210A and 210B. Data aggregator 204 may be further configured to query customer relationship management database 211 and retrieve any or all product or service information stored by the organizations associated with customer portals 210A and 210B. Thus, data aggregator 204 may be configured to generate and execute query strategies to identify and retrieve data objects from customer portals 210A and 210B and customer relationship management database 211, as well as contextual data associated with the data objects and one or more users.

Data aggregator 204 may also be communicatively coupled to user services and applications 208 via a communications network. In some implementations, a user may subscribe to different services and applications provided by a service provider, such as Salesforce.com®. For example, a user may subscribe to a social network service, such as Chatter® provided by Salesforce.com®. The social network service may be configured to store various information about the user as part of the user's profile. Thus, likes, posts, and entities or products that a user follows may be stored as profile information. Data aggregator 204 may be configured to query one or more storage locations maintained by the social network service to retrieve profile information and social network information associated with the user.

Support feed generation system 202 may further include information feed data store 216. In various implementations, feed data store 216 includes one or more storage volumes capable of storing information retrieved by data aggregator 204. Feed data store 216 may be configured to store data in one or more data tables. The data tables may store data objects and feed items and may be arranged based on attributes or contextual information associated with the feed items. Thus, feed data store 216 may provide a repository in which data objects, feed items, and feed tracked updates associated with objects, such as products, may be stored and continually updated. Moreover, the data tables may store any other contextual information or data retrieved by data aggregator 204. The data tables included in feed data store 216 may be queried and contents may be retrieved to generate support information feeds, as discussed in greater detail below with reference to FIGS. 3 and 5.

Support feed generation system 202 may further include query engine 217, which may identify and retrieve relevant data objects and feed items from feed data store 216. Query engine 217 may be configured to generate and execute one or more query strategies based on information aggregated by data aggregator 204 and stored in feed data store 216. The query strategy may be generated based on information associated with the user, such as the user's purchase history, products the user owns, and likes and posts made by the user. Information associated with related products may also be used to generate a query strategy. Thus, products identified based on user contextual information may also be used to formulate a query strategy. Once generated, query engine 217 may execute the query and retrieve any feed items stored in feed data store 216 that were returned as a result of the query.

Support feed generation system 202 may also include weighting engine 218. In some implementations, weighting engine 218 is configured to assign an order, score, rank, weight, position, or other identifier to at least one feed item retrieved by query engine 217. Weighting engine 218 may be configured to assign weights to feed items based on contextual information associated with the feed items and contextual information associated with the user for which the support information feed is being generated. Thus, weighting engine 218 may be configured to analyze information retrieved by data aggregator 204 and stored in feed data store 216, such as contextual information, and generate a score based on the analyzed information.

In some implementations, support feed generation system 202 includes support information feed generator 220, which may be configured to generate feed items and an information feed based on the weights generated by weighting engine 218. Support information feed generator 220 may generate an information feed comprising a predetermined number of feed items. Support information feed generator 220 may be configured to generated feed items based on the data objects retrieved by data aggregator 204. An information feed may be populated based on the weights assigned to feed items included in the information feed. Thus, support information feed generator 220 may select top or highly ranked feed items, and may included the selected feed items in an information feed. In some implementations, support information feed generator 220 may be configured to apply additional filters to further refine the feed items presented in the information feed. The additional filters may filter the feed items based on one or more feed item attributes, such as a product name, a product type, a type of feed item, a feed item source, a timestamp, an author, or a social influence. In some implementations, support information feed generator 220 is configured to use tokens to paginate a presentation of the generated feed. Thus, a fixed number of feed items may be forwarded to a rendering engine, such as rendering engine 224 discussed below, and presented in a user interface screen. The pagination of the information feed may be based on a target device. Thus, the number of feed items included and displayed in an information feed may be determined based on a type of device that the information feed is displayed on.

Support feed generation system 202 may further include rendering engine 224, which may be an application or process configured to render information feeds and feed items as graphical icons or user interface components that may be displayed in a display device. Thus, rendering engine 224 may be configured to render an information feed generated by support information feed generator 220, and further configured to provide the rendered information feed to a client device. As similarly discussed above, rendering engine 220 may render an information feed based on one or more characteristics of a target device. Thus, a presentation of the information feed may be determined based on graphical capabilities of the target client device.

Figure 3:
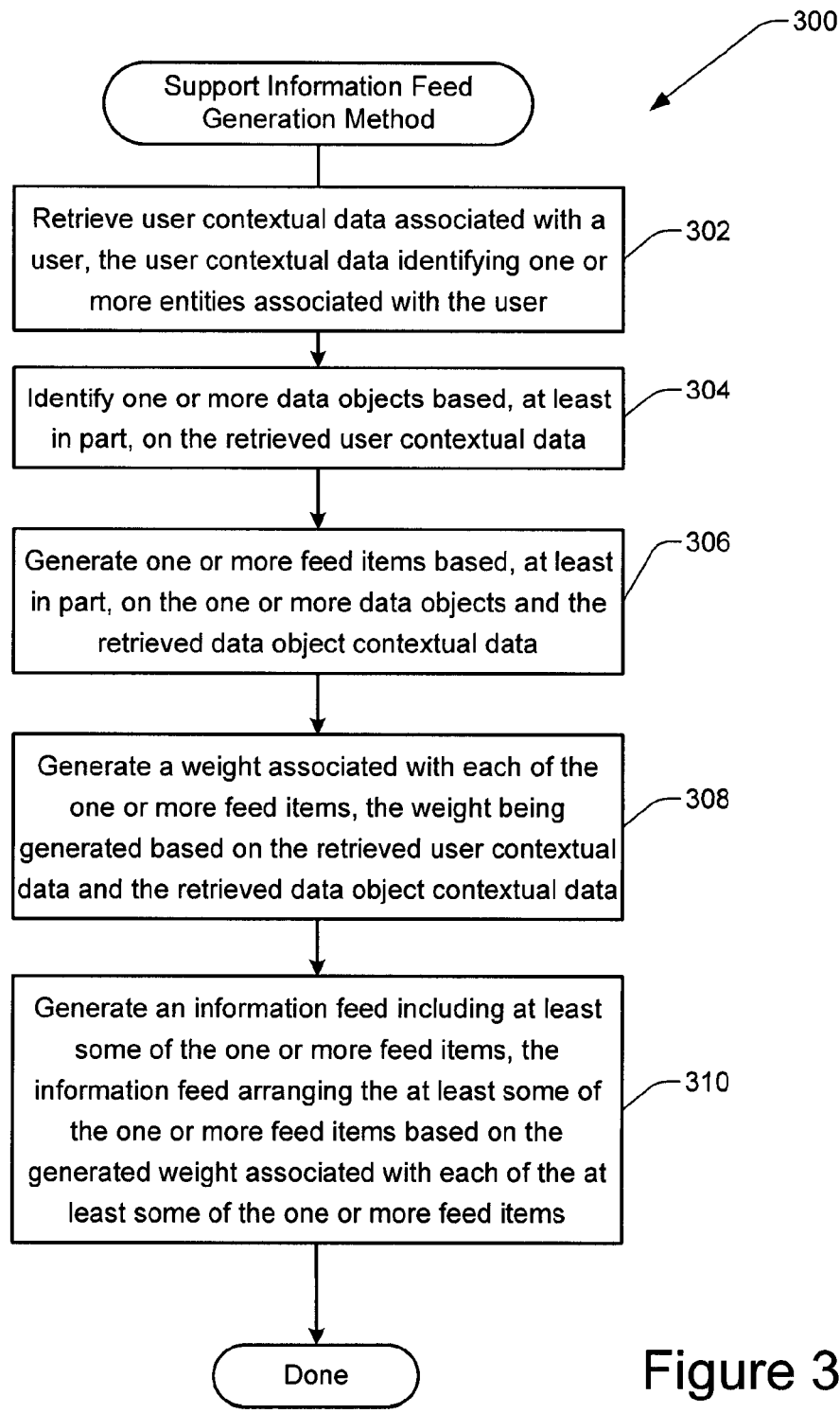
FIG. 3 illustrates a flowchart of an example of a method for aggregating contextual information about products and services associated with a user and generating a support information feed based on the aggregated information, in accordance with some implementations.

FIG. 3 illustrates a flowchart of an example of a method for aggregating contextual information about products and services associated with a user and generating a support information feed based on the aggregated information, in accordance with some implementations. The user may be a customer of various products and services. The user may subscribe to and use a support portal, which may be an on-demand service provided by a service provider, such as Salesforce.com®. Through the support portal, the user may be provided with various support information relating to the products and services that the user subscribes to. Thus, the support portal, and various hardware and software components thereof, may aggregate information and data about all products and services that the user owns, subscribes to, or is interested in. The information may include various updates, notifications, press releases, and other product related information. The support portal may convert the retrieved information into a format capable of being presented in an information feed. The retrieved information may be analyzed and weighted such that the product related information most relevant to the user is presented most prominently or in a highest position in an information feed. Once the weights have been determined, the support portal may generate and render the information feed, and present the information feed to the user. In this way, the user may be presented with the most relevant product related information retrieved from various different sources that may be distributed across the Internet.

Accordingly, at step 302, user contextual data associated with a user may be retrieved. The user contextual data may identify one or more entities associated with the user. In various implementations, the entities associated with the user are commercial products and services that the user may have, as a consumer, purchased, owned, or expressed interest in. A system component, such as a data aggregator, may query various sources, such as user profiles and user accounts, to retrieve user contextual data for a particular user.

Once the user contextual data has been retrieved, at step 304, one or more data objects may be identified based, at least in part, on the retrieved user contextual data. Thus, a system component, such as the data aggregator, may analyze and parse the contents of the retrieved user contextual data to isolate and identify specific names or other types of identifiers capable of identifying specific products and services. The identifiers or names may be used to formulate queries for various different information resources, such as online forums, blogs, and other information databases, to return any data objects related to the identified products and services. The data objects may be articles, posts, blog entries, or other web or electronic documents that relate to the identified products and services.

After the data objects have been identified, at step 306, data object contextual data associated with the one or more data objects may be retrieved. The data object contextual data may be metadata or other descriptive data which identifies various characteristics, such as an author, location, source, timestamp, or file type associated with the data objects.

Once the data object contextual data has been retrieved, at step 308, one or more feed items may be generated based, at least in part, on the one or more data objects and the retrieved data object contextual data. Thus, the retrieved information may be used to generate feed items, which may be data objects or data structures that are capable of being displayed in an information feed.

At step 310, a weight associated with each of the one or more feed items may be generated. The weight may be generated based on the retrieved user contextual data and the retrieved data object contextual data. Thus, each generated feed item may be assigned a weight or rank which identifies how relevant the feed item is to the user and the user's current context. In this way, various updates, notifications, announcements, and other product related information may be translated or converted to a data structure capable of being represented in an information feed, and weighted based on its relevance to the user.

At step 312, an information feed including at least some of the one or more feed items may be generated. The information feed may arrange the at least some of the one or more feed items based on the generated weight associated with each of the at least some of the one or more feed items. Accordingly, the presentation of the feed items may be modified by or configured based on the weights assigned to the feed items. In this way, the most relevant or highly ranked feed items may be presented most prominently within the information feed. Less relevant or lowly ranked feed items may be featured less prominently or omitted from the information feed entirely.

Figure 4:
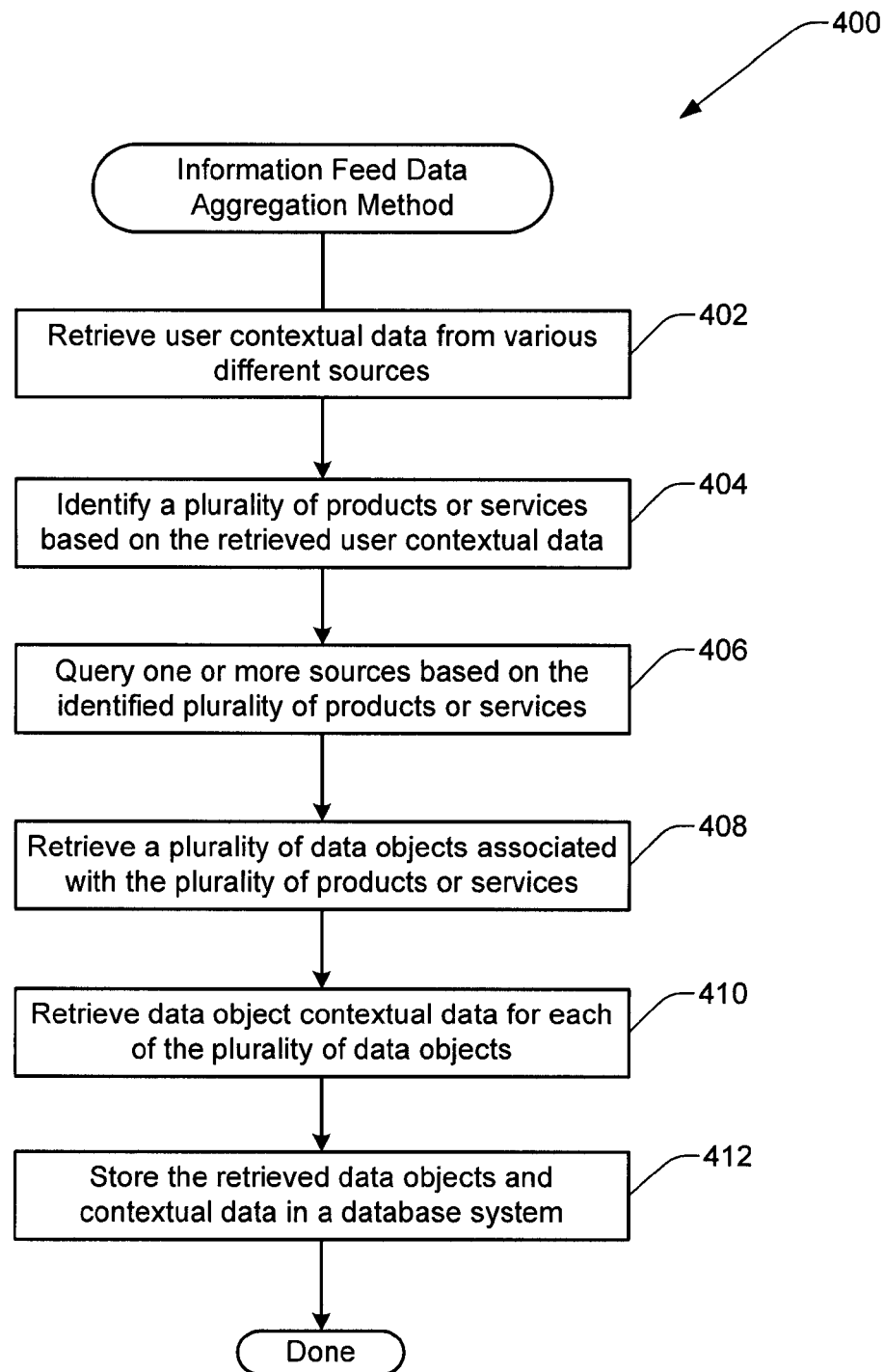
FIG. 4 illustrates a flowchart of an example of a method for aggregating information and data about products and services that may be associated with a user, in accordance with some implementations.

FIG. 4 illustrates a flowchart of an example of a method for aggregating information and data about products and services that may be associated with a user, in accordance with some implementations. As similarly discussed previously, a user may be a user of a service that provides a support portal to support information related to products and services owned by a user. Thus, the user may be a customer of various products and services. The support portal may provide the user with a unified view of information for any or all products and services that the user owns or uses. In various implementations, the system used to implement the support portal may be configured to formulate and execute query strategies to query various different sources associated with the user, and to identify and retrieve any data objects or contextual data that may relate to products or services that the user owns, is interested in, or subscribes to.

Accordingly, at step 402, user contextual data may be retrieved. As similarly discussed above, user contextual data may include one or more data values that identify various products and services that may be associated with a user. Various different storage locations may be used by one or more entities to store the user contextual data. The storage locations may be queried, and the contents of the storage locations may be retrieved. For example, user contextual data may be identified and retrieved from a user's profile that is stored in an online electronic commerce website, such as Amazon.com®. In this example, a user may have an account and a user profile with the commerce site. As part of the user's shopping and purchasing activities, a log of purchases, views, and wish lists may be maintained and stored as part of the user's profile. The user may have previously provided a service provider that provides the support portal and support information feed with login information for the user's account. A system component, such as a data aggregator, may use the previously provided login information to access the user's account. The data aggregator may identify the storage location and retrieve any data objects stored at that particular storage location.

User contextual data may also be identified and retrieved from other sources, such as social networks, forums, on-demand services, and blogs. Therefore, as similarly set forth above, user accounts with numerous different sources may be accessed, and user contextual data may be retrieved from storage locations within each source. The user contextual data aggregated from the different sources may be stored in a central location, such as a feed data store. Moreover, the aggregated user contextual data may be mapped into a uniform format and stored in a single data object specific to the user. Thus, the feed data store may store all user contextual information, which may be aggregated from different websites and services, in a single data object or data table which may be associated with the user by use of an identifier, such as a unique object identifier and/or a user identifier.

At step 404, a plurality of products or services may be identified based on the retrieved user contextual data. In some implementations, the user contextual data may include one or more data values that identify products and services associated with the user. A system component, such as a data aggregator, may analyze the retrieved user contextual data to identify and retrieve any data values that identify products or services. The data aggregator may be configured to analyze text included in the user contextual data to identify product or service names. For example, a brand name, such as Sony®, may be identified and retrieved. Moreover, data aggregator may apply one or more natural language processing algorithms to use surrounding words or information to further refine the identification of a specific product or service. Returning to the previous example, if the contextual data that included the mention of Sony® is a blog post about televisions, the product "Sony® television" may be identified. Furthermore, a system component, such as a data aggregator, may also analyze other information included in the user contextual data, such as a stock keeping unit (SKU number), international standard book number (ISBN number), or any other serial number or identifier used to identify commercial goods or services. In this way, the retrieved user contextual data may be analyzed to identify any products or services that are associated with the user and identified by the user contextual data. The identified products and services may be stored as a list of products and services in a central repository, such as a feed data store.

At step 406, one or more sources may be queried based on the identified plurality of products or services. The list of identified products and services may form the basis of a query strategy used to query multiple sources in order to subsequently identify and retrieve any support related data objects, such as upgrades, updates, or releases, that may be related to the identified products and services. A system component, such as a data aggregator, may formulate and execute a query strategy for each of the one or more sources. The query strategy may be configured to identify any data objects that may be stored at each of the one or more sources and that may be related to the identified products or services. In this way, the products and services identified at step 404 may be used to query various different sources and subsequently identify and retrieve data objects that relate to the identified products and services.

In some implementations, the one or more sources that are queried are identified based on a source or location associated with the user contextual data. User contextual data may be stored with one or more data values that identify a source or location from which the user contextual data was retrieved. For example, if user contextual data was retrieved from an e-commerce site, one or more data values identifying the e-commerce site may be stored with the user contextual data when the user contextual data was initially retrieved and stored in the central repository. In some implementations, the data values identifying the sources from which the user contextual data were retrieved are used to identify targets of the query for data objects. Thus, the data values identifying the e-commerce site may be retrieved and used to identify a target for the query.

The one or more sources may also be identified based on a predetermined list of sources. A system administrator or software provider may have previously generated a master list of sources that should be queried. The sources may include various repositories of information, such as a Knowledge article database, or various social networks, such as Twitter® and Facebook®. A system component, such as a data aggregator, may access the list, and configure the subsequently executed query for support related data objects to query each source identified in the predetermined list.

The one or more sources may be further identified based on a user-defined list of sources. As set forth above, a user may like, follow, or subscribe to different entities, such as product pages, which may be hosted by various different organizations at various different locations. For example, a user of a social network may "like" a product page for a cellular telephone, and "follow" a support page for a mobile operating system. The "like" and "subscribe to" operations performed by the user, as well as any associated metadata, may be logged stored as data objects in the user's profile within the social network. The metadata may include one or more data values that identify a source or location of the product page and the support page. The one or more data values may be retrieved and used to identify sources that will be targets of a subsequent query for data objects.

Once the one or more sources have been identified, a system component, such as a data aggregator, may formulate a query strategy for each source and execute each formulated query. In some implementations, the query strategy applied to a particular source may be selected or configured based on a type of target source. For example, if a target source, such as a source to be queried, is a blog or forum, the query strategy may be configured to crawl posts and comments made within threads and conversation topics. If a target source is an article or online publication, the query strategy may be configured to search or analyze title and authorship information as well as crawl the contents of the article or publication itself.

At step 408, a plurality of data objects associated with the plurality of products or services may be retrieved. As set forth above, a system component, such as a data aggregator may formulate various query strategies and execute the queries for each identified source. Any data object that is returned as a result of a query may be identified and retrieved by the data aggregator. In this way, data objects may be identified and retrieved from various different sources for products and services associated with the user.

At step 410, data object contextual data may be retrieved for each of the plurality of data objects. In some implementations, data object contextual data is contextual data that describes one or more attributes or characteristics at least one data object. The data object contextual data may include metadata for a particular data object, such as a timestamp, an author, a storage location, a source, or a type of feed item. The data object contextual data may also include data that relates to the content of the data object or a product or service associated with the data object, such as a brand name, a version, a number of shares, or a content load (e.g. .PDF file). A data object may be stored as a data structure that includes several data fields. At least some of the data fields may be used to store metadata associated with the data object. In some implementations, the data fields of the data object may be queried and data object contextual data may be retrieved from the data fields. This may be performed for each retrieved data object to retrieve data object contextual data for all of the retrieved data objects.

At step 412, the retrieved data objects and contextual data may be stored in a database system. Accordingly, the data objects and data object contextual data may be stored in a central repository, such as a feed data store, along with the user contextual data. As similarly set forth above, the data objects and data object contextual data may be stored in one or more data structures or data tables that are associated with a user and a user account or profile via a user identifier. The data and information stored in the central repository may be updated periodically by subsequent iterations of method 400.

Figure 5:
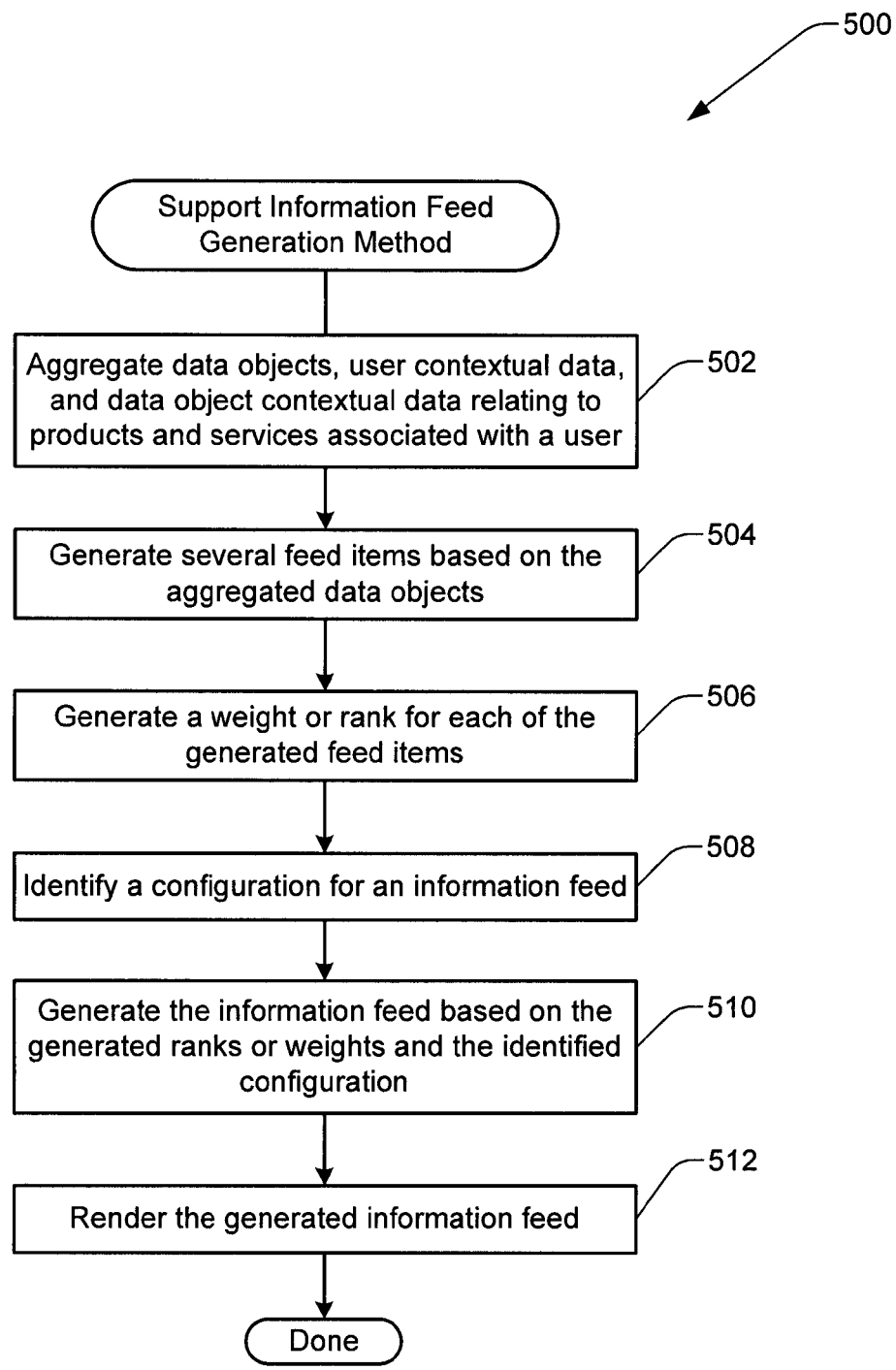
FIG. 5 illustrates a flowchart of an example of a method for generating and weighting or ranking feed items based on retrieved data, and generating an information feed including at least some of the generated feed items, in accordance with some implementations.

FIG. 5 illustrates a flowchart of an example of a method for generating and weighting feed items based on retrieved data, and generating an information feed including at least some of the generated feed items, in accordance with some implementations. As set forth above with reference to FIG. 4, various information and data may be aggregated relating to products and services associated with a user. The aggregated information may be analyzed to generate an information feed that is weighted and ranked based on the user's context and the products and services associated with the user. Feed items may be generated based on the aggregated information, and weights or ranks may be determined for each feed item based on a fit or match between user contextual data and contextual data associated with the retrieved data objects. The ranks and weights may be used to determine a position of several feed items within the support information feed. The support information feed may be rendered and presented to the user as part of the unified view presented in the support portal.

At step 502, data objects, user contextual data, and data object contextual data relating to products and services associated with a user may be aggregated. As set forth above with respect to FIG. 4, data objects related to various products and services that may have been used, purchased, or viewed by a user may be retrieved as well as various contextual data associated with the data objects. The retrieved data objects and contextual data may be stored in a central repository, such as a feed data store, and subsequently accessed when a support information feed is generated.

Accordingly, at step 504, several feed items may be generated based on the aggregated data objects. The data objects may be various different types of data objects and files, such as blog entries, forum posts, articles, support pages or portions thereof, and any other portion of a queried source described herein. In some implementations, the retrieved data objects are raw retrieved data. Feed items may be generated based on the raw retrieved data to generate a representation of the raw retrieved data that may be easily identified and presented in an information feed that may be subsequently rendered and presented in a user interface screen of a display device.

A system component, such as a feed generator, may be configured to generate feed items based on the retrieved data objects. The feed generator may be configured to map information included in retrieved data objects to a normalized data structure used to store feed items. The feed generator may be configured to analyze the retrieved data object to identify contents of the feed item that will be generated. The contents of the feed item may be determined based on a type of data included in the retrieved data object. For example, if a support page has been updated, the feed generator may analyze the contents of the support page, identify the portion of the page announcing the update based on section identifiers used by the publisher of the support page or based on natural language processing techniques, and generate a feed item configured to store one or more data values identifying the update announced in the support page.

Moreover, data included in the retrieved data objects may be used to automatically generate contents for one or more data fields included in the generated feed item. For example, automatically generated text may be generated based on one or more characteristics of a retrieved data object and stored in a data field, such as a text field, of the generated feed item. If a news article has been retrieved that announces a release of a new upgrade or update for a software application, text may be generated that states "A new update is available for this software application." The generated text may be stored in a data field of the generated feed item and displayed in an information feed when rendered by a system component, such as a rendering engine.

While various embodiments disclosed herein describe generation of feed items as being performed after the data objects have been retrieved and stored, the generation of feed items may take place during the process of retrieving data objects thus avoiding retrieval of large or superfluous data objects. For example, if a data object is identified as relevant to a query, information included in the data object may be used to generate a feed item, and the feed item may be stored in the central repository. In this example, the raw data of the data object is not stored in the central repository. Instead, a feed item is generated dynamically and stored in the central repository.

Furthermore, in some implementations, the retrieved data objects are feed items generated by another service or service provider. For example, data objects retrieved from social networks or services such as Facebook®, Twitter®, and Chatter® may be feed items instead of raw data objects. In this example, no feed item is generated at step 504. Instead, method 500 may store the feed items retrieved from the social networks and services, and subsequently weight and rank them as discussed below. Moreover, structural and organizational metadata associated with the feed items may be retrieved as well. For example, if a feed item belongs to a group, one or more identifiers that identify the group may be retrieved as well.

At step 506, a weight or rank may be generated for each of the generated feed items. The rank for a particular feed item may be determined by comparing user contextual data with data object contextual data and contents of the data objects and feed items. Thus, the rank for a feed item may be generated based, at least in part, on the retrieved user contextual data, which may include user profile data, such as a user's professional field, specialty, technical expertise, and professional skills. The user profile data may be retrieved from the user's profile in a support portal, social network, or other service. As set forth above with reference to FIG. 4, the user contextual data may also include the user's purchase history, other logged e-commerce activities, and user-defined lists. The user contextual data may further include statistical metrics or analyses performed based on user information, such as a determination that a user is a particular type of buyer.

The rank for a feed item may be generated by comparing the previously mentioned user contextual data with retrieved data object contextual data, which, as previously discussed, may be metadata associated with each retrieved data object. The metadata may include one or more data values identifying a timestamp, number of shares, re-posts, follows, tweets, mentions, a source of the information, an author, and a type of update. The user contextual data may also be compared with the contents of the data object underlying the feed item, or the contents of the feed item itself.

A feed item may be ranked highly or weighted heavily if the data object contextual data and contents of the data object and feed item are closely related to the user contextual data. For example, a user may have recently purchased a laptop computer made by a particular manufacturer. The laptop computer manufacturer may have released and update to a basic input output system (BIOS) installed on the laptop computer. The update may have been released as a data object in an RSS feed published by the laptop computer manufacturer. The data object and associated data object contextual data may have been retrieved and a corresponding feed item may have been generated. A system component, such as a weighting engine, may compare user contextual data, which may identify a recent purchase of the laptop computer by the user, with the data object and feed item contents as well as the data object contextual data, which may identify the laptop computer manufacturer, the laptop computer, and the recently released update. Because the feed item relates to a product that the user has recently purchased and because the data object underlying the feed item was recently created, the feed item may be ranked as highly relevant to the user.

In various implementations, the comparison of the data and the generation of the rank, weight, score, position, or other identifier is determined based on how closely a feed item and its associated data, which may include the underlying data object and data object contextual data, match the user contextual data. As previously mentioned, this determination may be made based on a comparison of the user contextual data with data object contextual data, data object contents, and feed item contents. Data values stored in the user contextual data and stored in the feed item and its associated data may be normalized and mapped to different data fields in two different data objects. The data fields of the data objects may be compared using a matching algorithm, such as fuzzy matching, to determine how closely the feed item and its associated data match the user contextual data. A rank or weight may be generated based on a result of the matching algorithm. If the matching algorithm identifies a close match, a high rank or heavy weight may be generated and stored in a feed data store with the feed item. If the match is not close or there is no match at all, a low rank or low weight may be generated and stored.

The rank or weight may also be determined, at least in part, based on the presence of one or more data values within a feed item or its associated data, which may include the underlying data object and data object contextual data. For example, if a feed item or data object has been authored by a Fortune 500® company, data object contextual data may include one or more data values identifying the author of the data object as the Fortune 500® company. A system component, such as a weighting engine, may be configured to analyze the contents of the data object contextual data, and to rank or weight a feed item higher if the data object underlying the feed item is authored by a Fortune 500® company. This may be accomplished by comparing the authorship data included in the data object contextual data with a predetermined list of Fortune 500® companies. In some implementations, in response to identifying the author as a Fortune 500® company, the weighting engine may add to or increase the rank or weight determined by the matching algorithm discussed above. While the above example describes adjusting or determining a rank or weight based on authorship data, any type of data included in the data object contextual data may be used or provide the basis for adjusting or determining the rank.

The rank or weight may also be determined, at least in part, based on a location of the matching or fitting information within a data structure. In some implementations, the user contextual data, feed items, and data object contextual data are stored in data structures that have particular data fields that are configured to store a particular type of data and are identified by data field specific identifiers. For example, one or more data values identifying a product name may be stored in a specific data field dedicated to store product names and identified by a particular identifier. In some implementations, the weighting engine is configured to rank or weight matches identified in the product name data field higher than matches identified in other data fields. Thus, in response to a matching algorithm identifying a match between a product name data field of a data structure storing user contextual data and a product name data field of a data structure storing data object contextual data, the weighting engine may add to or increase the rank or weight determined by the matching algorithm. While the above example describes adjusting or determining a rank or weight based on data fields configured to store product names, any type of data field may be used or provide the basis for adjusting or determining the rank In some implementations, each feed item is ranked or weighted when stored in the feed item data store. The process of generating ranks or weights may be performed and updated periodically. Furthermore, feed items may be ranked or weighted when a support information feed is generated. The generation of ranks or weights for feed items may also be performed in response to an input, such as a user request for the presentation of a user interface screen for a support portal that includes the support information feed.

At step 508, a configuration for an information feed may be identified. The configuration may identify one or more parameters which may be used to configure a generation and presentation of the support information feed that is generated for the support portal. The one or more parameters may include a number of feed items that may be presented in the information feed at a particular time, a presentation of graphical user interface components that may be generated to represent the feed items, and any filters or settings which may have been selected or identified. In some implementations, the filters or settings may have been previously determined by a user to customize or modify a presentation of the support information feed. The parameters may also identify a type of target device that the support information feed will be displayed on. Such information may have been retrieved from a user profile and included in the retrieved user contextual data.

At step 510, the information feed may be generated based on the generated ranks or weights and the identified configuration. The information feed may be generated by a system component, such as a feed generator, by selecting one or more feed items based on ranks or weights associated with the feed items and also based on the identified configuration. For example, the feed generator may be configured to select a predetermined number of the highest ranked feed items to be included in the support information feed. In a particular example, the feed generator may identify feed items in the feed data store that have the highest ten ranks or weights. The feed generator may order the ten feed items according to their ranks and package the result as a result object that is sent to a rendering engine for subsequent rendering and presentation at a user interface screen of a display device.

Accordingly, top ranked feed items may be selected and included in the information feed. Additional filters may be applied to further refine the feed items presented in the information feed. Filters may filter the feed items based on one or more feed item attributes, such as product, product type, type of feed item, feed item source, timestamp, author, or social influence. The generated information feed may also be paginated. Thus, multiple feed items may be identified and packaged into separate result objects, each representing a page of the generated information feed. In some implementations, tokens may be used to navigate between pages. The number of feed items included in a page may be determined by a user or determined automatically based on user contextual data, such as a type of target device or a platform or operating system installed on the target device.

At step 512, the generated information feed may be rendered. A system component, such as a rendering engine may receive one or more result objects generated by the feed generator. As set forth above, each result object may include various feed items to be displayed in a support information feed. The rendering engine may unpack a received result object and render the feed items included in the result object to generate a rendered representation of the information feed generated by the feed generator. The rendering may also be configured to handle intermediate processing or other rendering functionalities to render feed items and feed item components as user interface components configured to link to the data objects underlying the feed items, or configured to trigger the rendering and presentation of additional feed items, data object contextual data, or user contextual data. Examples of rendered user interface screens for support portals that include user profiles and support information feeds for various users are discussed in greater detail below with reference to FIG. 6 through FIG. 9.

Figure 6:
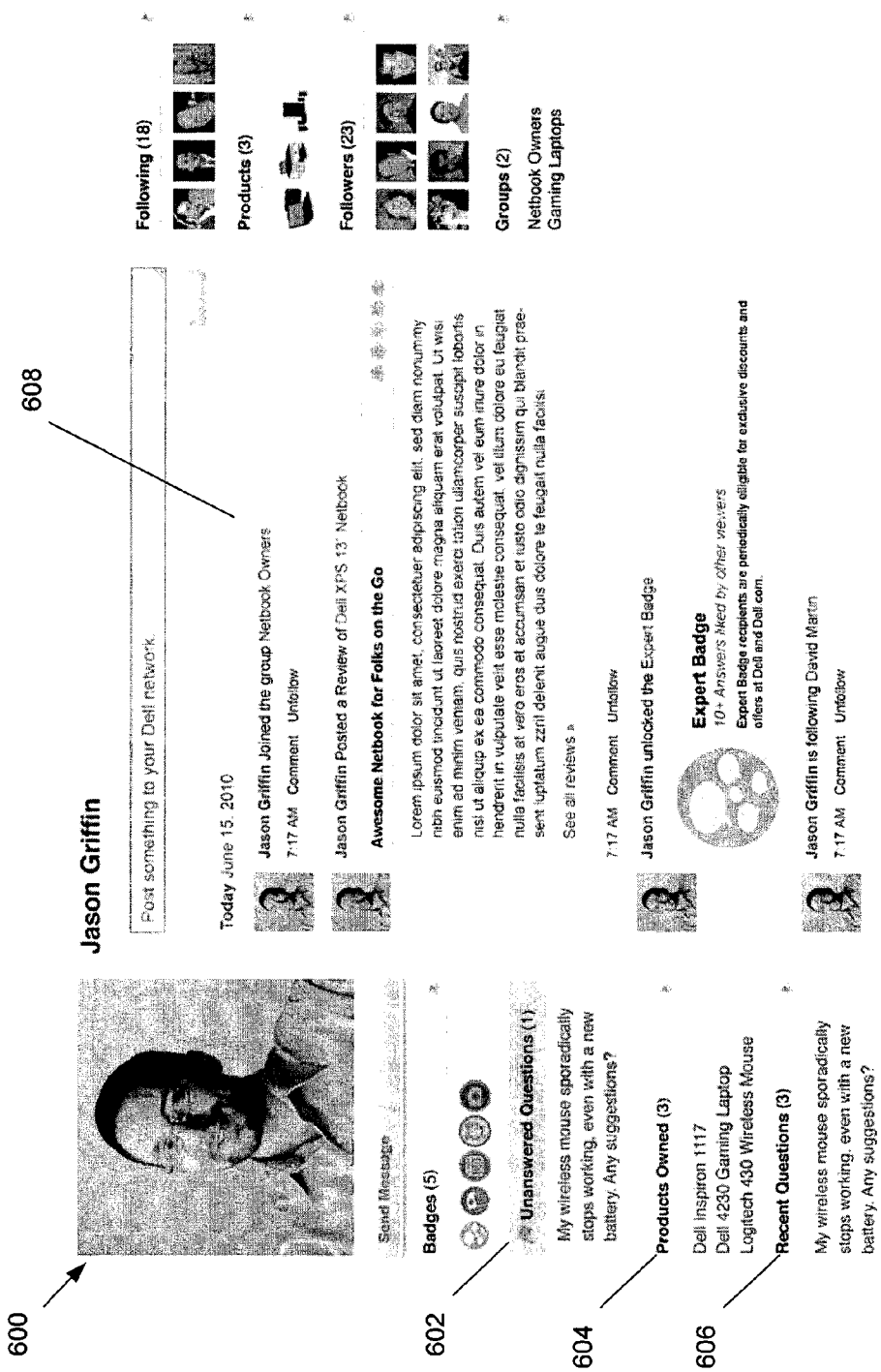
FIG. 6 illustrates an example of an image of a user interface screen that may display a unified view of user profile stored by a support portal, in accordance with some implementations.

FIG. 6 illustrates an example of an image of a user interface screen that may display a unified view of user profile stored by a support portal, in accordance with some implementations. Image 600 may display a graphical representation of a user profile for a user that may be a customer in a particular industry. Image 600 may provide a unified view of the customer's user profile that displays various information about products and services that the customer has purchased, support issues the customer has had that relate to those products and services, as well as any recent actions or activities that the customer has taken. For example, image 600 may include data field 602 which may be configured to display one or more questions the customer has posted in a forum or on a support page. In this instance, data field 602 indicates that the question has not yet been answered. Image 600 may further include data field 604 which may identify products that the customer owns. The data values displayed in data field 604 may have been aggregated as user contextual data by a system component, such as a data aggregator, as discussed above with reference to FIG. 4. Image 600 may also include data field 606 which may display other aggregated data, such as recent questions that the customer has posted or authored in various forums. In some implementations, image 600 includes data field 608 which displays an information feed generated based on retrieved user contextual data. The information feed displayed in data field 608 displays any recent activity associated with the user.

Figure 7:
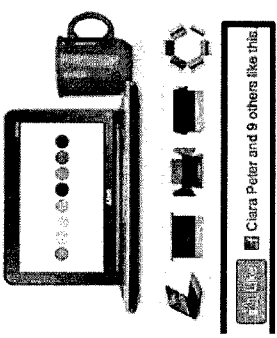
FIG. 7 illustrates an example of an image of a user interface screen that may display a unified view of a product profile stored by a support portal, in accordance with some implementations.

FIG. 7 illustrates an example of an image of a user interface screen that may display a unified view of a product profile stored by a support portal, in accordance with some implementations. As similarly discussed above with reference to FIG. 6, image 700 may display a graphical representation of a product or service profile for a product or service that may be offered in a particular industry. Image 700 may include data field 702 which may display descriptive information about the product itself. Image 700 may also include data field 704, which may include one or more user interface components configured to provide a link to additional information or support pages associated with the product. Image 700 may further include data field 706 which may display an information feed displaying any recent activity associated with the product. In some implementations, the information feed incorporates information from or is generated by a social network or service, such as Chatter® provided by Salesforce.com®. The information displayed in image 700 may be augmented by, supplemented by, or retrieved from information stored in a system component, such as a feed data store. Thus, the information displayed in data field 706 may include data objects and data object contextual data retrieved from the feed data store.

Figure 8:
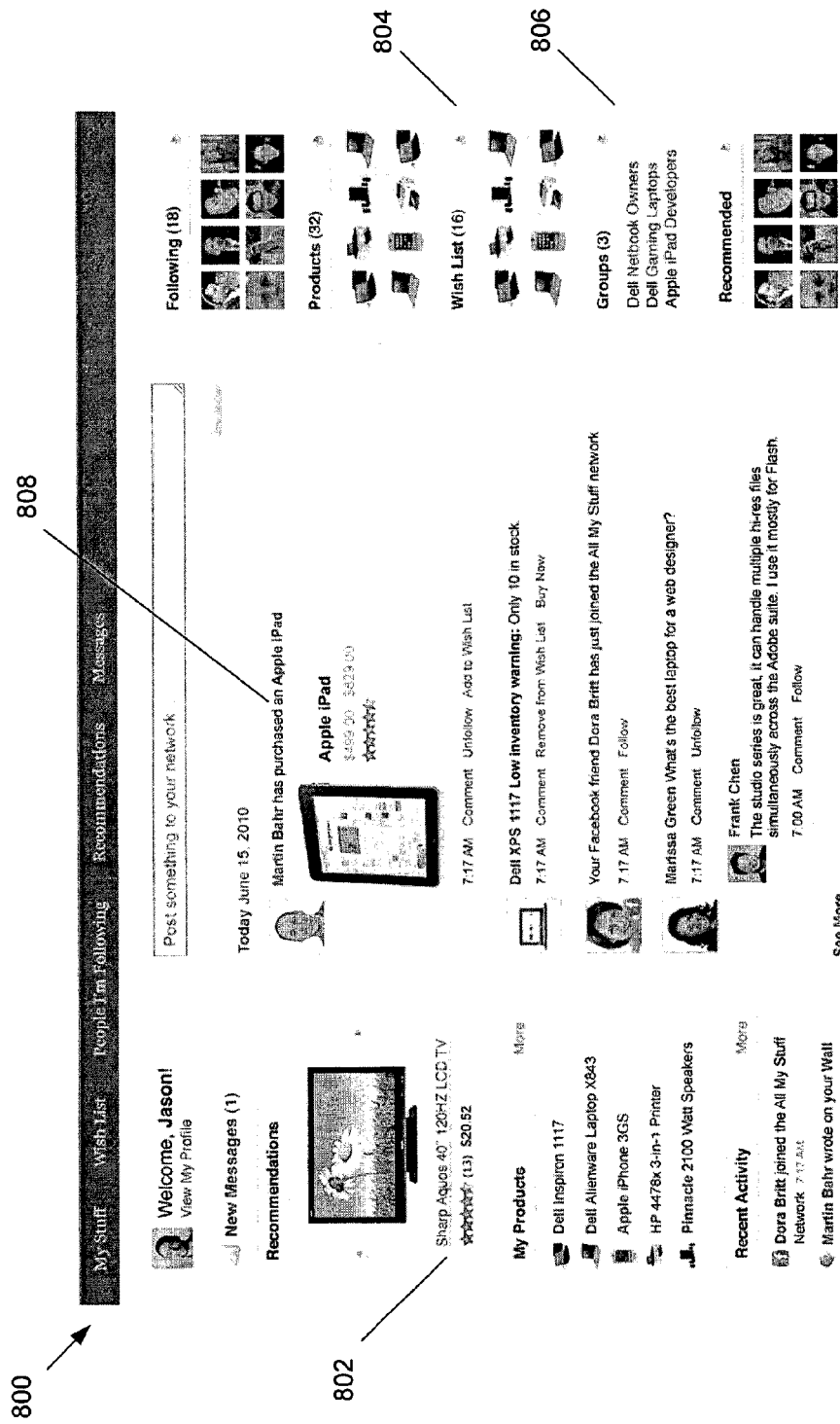
FIG. 8 illustrates an example of an image of a user interface screen that may display a support information feed for products and services associated with a user, in accordance with some implementations.

FIG. 8 illustrates an example of an image of a user interface screen that may display a support information feed for products and services associated with a user, in accordance with some implementations. Image 800 may provide a user, such as a customer, with a unified view of the user's instance of a support portal. The unified view may provide the user with a single interface that displays various information about products and services owned by the user, and any relevant updates, upgrades, or other information that may be related to the products and services owned by the user. As similarly set forth above with reference to FIG. 6, image 800 may include data field 802 which may display products and services associated with a user, as may be identified based on retrieved user contextual data. Image 800 may further include data field 804 which may display additional user contextual data which may have been retrieved from commerce related websites, such as the contents of one or more wish lists that may have been retrieved from various different sources. Image 800 may also include data field 806 which may include additional user contextual data which may have been retrieved from social networks, such as one or more product related groups that the user belongs to. In some implementations, image 800 includes data field 808 which displays a support information feed. The support information feed may include various feed items that have been generated based on data objects aggregated from various different sources. As set forth above with respect to FIG. 5, the presentation of the feed items within the information feed may be determined based on weight generated based on user contextual data and data object contextual data associated with each feed item. In this instance, a feed item identifying a social connection's purchase of a product may be highly ranked based on a relatedness of the purchased product to products that the user owns and based on an identity of the purchasing entity, which is a social connection of the user. Because the feed item is ranked highly, it has been presented highest and most prominently in the information feed displayed in data field 808.

Figure 9:
FIG. 9 illustrates an example of an image of a user interface screen that may display a support information feed for products and services associated with a user and filtered based on one or more parameters, in accordance with some implementations.

FIG. 9 illustrates an example of an image of a user interface screen that may display a support information feed for products and services associated with a user and filtered based on one or more parameters, in accordance with some implementations. As similarly set forth above with reference to FIG. 8, image 900 may provide a user with a unified view of the user's instance of a support portal. Data displayed in the presentation may have been filtered based on one or more parameters which may have been predetermined or may have been determined based on an input provided by the user. In this instance, the user has indicated that only feed items for a particular manufacturer, such as Dell®, should be displayed. Accordingly, image 900 includes data field 902 which displays feed items for a support information feed filtered based on the specified manufacturer, Dell®. As similarly discussed previously, the feed items presented in the information feed are weighted based on an analysis of user contextual data, data object contextual data, data object contents, and feed items contents. However, the feed items have been filtered so that only feed items relating to the manufacturer Dell® are displayed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for generating an information feed based on contextual data, the method comprising:
   retrieving, by a database system, user contextual data associated with a user, the user contextual data identifying one or more entities associated with the user;
   retrieving, from one or more data object sources by the database system, one or more data objects based on the retrieval of the user contextual data, wherein the only data objects retrieved are related to the retrieved user contextual data;
   retrieving, by the database system, data object contextual data based on the retrieval of the one or more data objects, the data object contextual data being associated with the one or more data objects;
   generating, by the database system, one or more feed items based, at least in part, on the one or more retrieved data objects and the retrieved data object contextual data;
   generating, by the database system, a weight associated with each of the one or more feed items, the weight being generated based on the retrieved user contextual data and the retrieved data object contextual data; and
   generating, by the database system, an information feed including at least some of the one or more feed items, the information feed arranging the at least some of the one or more feed items based on the generated weight associated with each of the at least some of the one or more feed items.

2. The method of claim 1, wherein the weight is generated by applying a matching algorithm to the user contextual data and the data object contextual data.

3. The method of claim 2, wherein the matching algorithm uses, at least in part, fuzzy matching.

4. The method of claim 1, wherein the at least some of the one or more feed items included in the information feed are selected based on generated weights associated with each of the at least some of the one or more feed items.

5. The method of claim 1, wherein arranging the at least some of the one or more feed items comprises assigning a position or rank to each of the at least some of the one or more feed items based on the generated weights.

6. The method of claim 1, wherein retrieving, from the one or more data object sources, only the one or more data objects related to the retrieved user contextual data further comprises:
   identifying the one or more entities based on the retrieved user contextual data; and
   retrieving the one or more data objects from one or more data object sources based on the identified one or more entities.

7. The method of claim 1, wherein the at least some of the one or more feed items included in the information feed are paginated based on a target device.

8. The method of claim 1, wherein the one or more entities comprise products and services that the user owns or subscribes to.

9. The method of claim 1, wherein the user contextual data comprises one or more data values identifying at least a plurality of products or services that the user owns or subscribes to.

10. The method of claim 1, wherein the user contextual data is retrieved from a user profile stored in at least one location selected from the group consisting of: a social network, a service provided by a service provider, an online electronic commerce website, a customer portal, and a customer relationship management database system.

11. The method of claim 1, wherein the data object contextual data includes one or more data values identifying metadata associated with each of the one or more data objects.

12. The method of claim 1, wherein the one or more feed items are retrieved from at least one source selected from the group consisting of: an Internet source, a blog, an article, a social network, a service provided by a service provider, a customer portal, a customer relationship management database, a product support page, an Internet webpage, and an online forum.

13. A non-transitory machine-readable medium carrying one or more sequences of instructions which, when executed by one or more processors, cause the one or more processors to carry out the steps of:
   retrieving user contextual data associated with a user, the user contextual data identifying one or more entities associated with the user;
   retrieving, from one or more data object sources, one or more data objects based on the retrieval of the user contextual data, wherein the only data objects retrieved are related to the retrieved user contextual data;
   retrieving data object contextual data based on the retrieval of the one or more data objects, the data object contextual data being associated with the one or more data objects;
   generating one or more feed items based, at least in part, on the one or more data objects and the retrieved data object contextual data;
   generating a weight associated with each of the one or more feed items, the weight being generated based on the retrieved user contextual data and the retrieved data object contextual data; and
   generating an information feed including at least some of the one or more feed items, the information feed arranging the at least some of the one or more feed items based on the generated weight associated with each of the at least some of the one or more feed items.

14. The machine-readable medium of claim 13, wherein the weight is generated by applying a matching algorithm to the user contextual data and the data object contextual data.

15. The machine-readable medium of claim 14, wherein the matching algorithm uses, at least in part, fuzzy matching.

16. The machine-readable medium of claim 13, wherein the at least some of the one or more feed items included in the information feed are selected based on generated weights associated with each of the at least some of the one or more feed items.

17. The machine-readable medium of claim 13, wherein arranging the at least some of the one or more feed items comprises assigning a position or rank to each of the at least some of the one or more feed items based on the generated weights.

18. A system for generating an information feed based contextual data, the system comprising:
   a processor; and
   one or more stored sequences of instructions which, when executed by the processor, cause the processor to carry out the steps of:
      retrieving user contextual data associated with a user, the user contextual data identifying one or more entities associated with the user;
      retrieving, from one or more data object sources, one or more data objects based on the retrieval of the user contextual data, wherein the only data objects retrieved are related to the retrieved user contextual data;
      retrieving data object contextual data based on the retrieval of the one or more data objects, the data object contextual data being associated with the one or more data objects;
      generating one or more feed items based, at least in part, on the one or more data objects and the retrieved data object contextual data;
      generating a weight associated with each of the one or more feed items, the weight being generated based on the retrieved user contextual data and the retrieved data object contextual data; and
      generating an information feed including at least some of the one or more feed items, the information feed arranging the at least some of the one or more feed items based on the generated weight associated with each of the at least some of the one or more feed items.

19. The system of claim 18, wherein the weight is generated by applying a matching algorithm to the user contextual data and the data object contextual data, and wherein the matching algorithm uses, at least in part, fuzzy matching.

20. The system of claim 18, wherein the at least some of the one or more feed items included in the information feed are selected based on generated weights associated with each of the at least some of the one or more feed items, and wherein arranging the at least some of the one or more feed items comprises assigning a position or rank to each of the at least some of the one or more feed items based on the generated weights.

* * * * *